United States Patent [19]

Hahn

[11] Patent Number: 5,628,641

[45] Date of Patent: May 13, 1997

[54] COLLAPSIBLE PLUG DEVICE FOR BATTERY CHARGER

[75] Inventor: Stan S. Hahn, Moraga, Calif.

[73] Assignee: Asian Micro Sources, Inc., Moraga, Calif.

[21] Appl. No.: 553,085

[22] Filed: Nov. 3, 1995

Related U.S. Application Data

[63] Continuation of Ser. No. 201,474, Feb. 24, 1994, abandoned.

[51] Int. Cl.[6] ........................... H01R 13/44
[52] U.S. Cl. ........................... 439/131; 439/172
[58] Field of Search ........................... 439/131, 135, 439/142, 352, 928, 929, 172, 217, 218, 219, 220, 221, 222

[56] References Cited

U.S. PATENT DOCUMENTS

| | | | |
|---|---|---|---|
| 1,485,193 | 2/1924 | McKay | 439/131 OR |
| 1,742,850 | 1/1930 | Douglas | 439/314 OR |
| 2,490,580 | 12/1949 | Colla | 439/131 X |
| 2,538,296 | 1/1951 | Crocker | 439/131 X |
| 4,191,917 | 3/1980 | Brown et al. | 439/221 X |
| 4,518,212 | 5/1985 | Rumble | 439/221 X |
| 4,543,624 | 9/1985 | Rumble | 439/173 X |
| 4,626,052 | 12/1986 | Rumble | 439/173 OR |
| 4,743,829 | 5/1988 | Fenne et al. | 439/131 X |
| 4,911,649 | 3/1990 | Helmich, Jr. | 439/172 X |
| 4,973,827 | 11/1990 | Nozaki | 439/173 X |
| 4,997,381 | 3/1991 | Oh | 439/131 X |
| 5,159,545 | 10/1992 | Lee | 439/173 X |
| 5,213,516 | 5/1993 | Okamoto | 439/171 X |

FOREIGN PATENT DOCUMENTS 7600749  8/1976  Netherlands.

*Primary Examiner*—David L. Pirlot
*Assistant Examiner*—Daniel Wittels
*Attorney, Agent, or Firm*—Adam H. Tachner; Crosby, Heafey, Roach & May

[57] ABSTRACT

A collapsible plug device includes a casing, an electrical plug rotatably mounted in the casing and movable between a collapsed and an extended position, and a releasable locking mechanism connected to the casing and designed to engage the electrical plug to maintain the plug in an extended position. The locking mechanism can be released by a user to allow the plug to be moved to the collapsed position. A preferred form of locking mechanism is a slidable lock bar which is designed to engage a detent in a rotatable shaft which is connected to or integral with an electrical plug body.

A cradle or attachment can be integrated into the casing, with an electrical connection and a mechanical connection so that a rechargeable battery or a device containing such a battery can be electrically and mechanically attached to the cradle. Alternatively, a cable can be fitted with a power adapter plug and electrically connected to the basic device. A power supply within the casing allows the rechargeable device to be attached to the collapsible plug device and plugged directly into a wall socket.

10 Claims, 5 Drawing Sheets

COLLAPSIBLE PLUG DEVICE FOR BATTERY CHARGER

This is a continuation of application Ser. No. 08/201,474 filed on Feb. 24, 1994, now abandoned, entitled COLLAPSIBLE PLUG DEVICE FOR BATTERY CHARGER.

FIELD OF THE INVENTION

The present invention relates generally to an improved folding plug mechanism which is capable of folding into a casing for convenient transportation or storage and also capable of rotating to and locking in an extended position for insertion into a wall socket or extension cord.

BACKGROUND OF THE INVENTION

A wide variety of portable electrical devices available today make use of rechargeable batteries. For many devices, such as portable phones, video games, calculators, and the like, a battery is or can be fitted within the device itself. For some devices, the battery can be removed easily, while in other devices, the battery is not designed to be removed.

A variety of battery chargers are available for use with such devices. In general, a manufacturer provides a battery charger specifically designed for use with one or more products. Traditionally, the battery chargers are bulky devices, often weighing 500 grams or more. The specific size of the battery charger is determined by a number of factors, including power to be delivered during recharging and the presence or absence of special circuitry, for example to monitor the state of charge of a battery.

In one typical configuration, a power cord goes between the power supply and a wall socket, with a second power cord extending between the power supply and the device containing the battery. In another typical configuration, the power supply is built into a large module which is designed to be plugged directly into a wall socket. A single cord connects the power supply to the battery.

In some devices, a cradle or receptacle is built into a casing which is designed to accommodate a device including a battery, or sometimes a removable battery or battery pack. Many cellular or cordless phones are designed to mate with such a cradle in a recharging station. Many batteries for computers or power tools are also designed to mate with such a cradle or recharging station. The power supply may be incorporated in the charging station or may be separate.

A few plug devices have been designed with a plug or prongs which fold into a casing. This is particularly helpful for a device which may be moved from location to location or which is incorporated into the body of a device. For example, some rechargeable flashlights include the collapsible prongs which can be rotated into a position extending out from the body of the flashlight and plugged directly into a wall socket or extension cord. In another example, some telephone charging stations include a cradle for the telephone and a rotatable plug which can be extended into position for plugging into a wall socket, or collapsed into a space in the shell of the charging station, particularly so that a user may slip a charging station into a pocket, a briefcase, or other container, or simply for storage, as in a drawer.

Presently available collapsible plug devices suffer from various problems which make them inconvenient or even dangerous to use. In particular, the rotatable plug has only a weak spring holding the plug in position. It does not take much effort to collapse the plug, which may cause the plug to partially or completely pull out of a wall socket. This can compromise the electrical connection to the point that the plug no longer is in electrical contact with source current. In some circumstances, this may expose the prongs of the plug in such a way that a person, or even an animal, might come into contact with live current, thereby causing bodily harm. In addition, a collapsing plug might pinch the user.

The new device of this invention overcomes these problems by providing a plug device which can be securely locked in the extended position.

SUMMARY OF THE INVENTION

The present invention is a collapsible plug device including a casing, an electrical plug rotatably mounted in the casing and movable between a collapsed and an extended position, and a releasable locking means mechanically connected to the casing and designed to engage the electrical plug to maintain the plug in an extended position. The locking means can be released by a user to allow the plug to be moved to the collapsed position.

The invention also includes a cradle or attachment means integrated into the casing. This can be fitted with an electrical connection and a mechanical connection so that a rechargeable battery or a device containing such a battery can be electrically and mechanically attached to the cradle.

In a preferred embodiment, a power supply is provided within the casing so that the rechargeable device can be attached to the collapsible plug device and plugged directly into a wall socket. In another preferred embodiment, the device is coupled with a rechargeable device to provide an improved battery charging station. In yet another preferred embodiment, a power supply in the casing is connected by a wire and suitable adapter to an electronic device.

A preferred form of locking mechanism is a slidable lock bar which is designed to engage a detent in a rotatable shaft which is connected to or integral with an electrical plug body.

Accordingly, it is an object of this invention to provide a collapsible plug device which can be locked in an extended position.

Another object of this invention is to provide releasable locking means so that a user can readily release the locking mechanism and move the plug from an extended to a collapsed position.

DESCRIPTION OF THE PREFERRED EMBODIMENTS

The collapsible plug device of this invention includes a casing, a plug mounted to the casing, and a locking device. The specific shape of the casing can be modified in many ways to accommodate specific design needs. The plug can also be modified to accommodate specific design needs, including the number and configuration of electrical prongs to adapt to a variety of standard, electrical outlets. The drawings illustrate a representative device but one skilled in the art will recognize that a variety of devices can be designed and manufactured, which are encompassed by the teachings of this invention.

Figure 1:
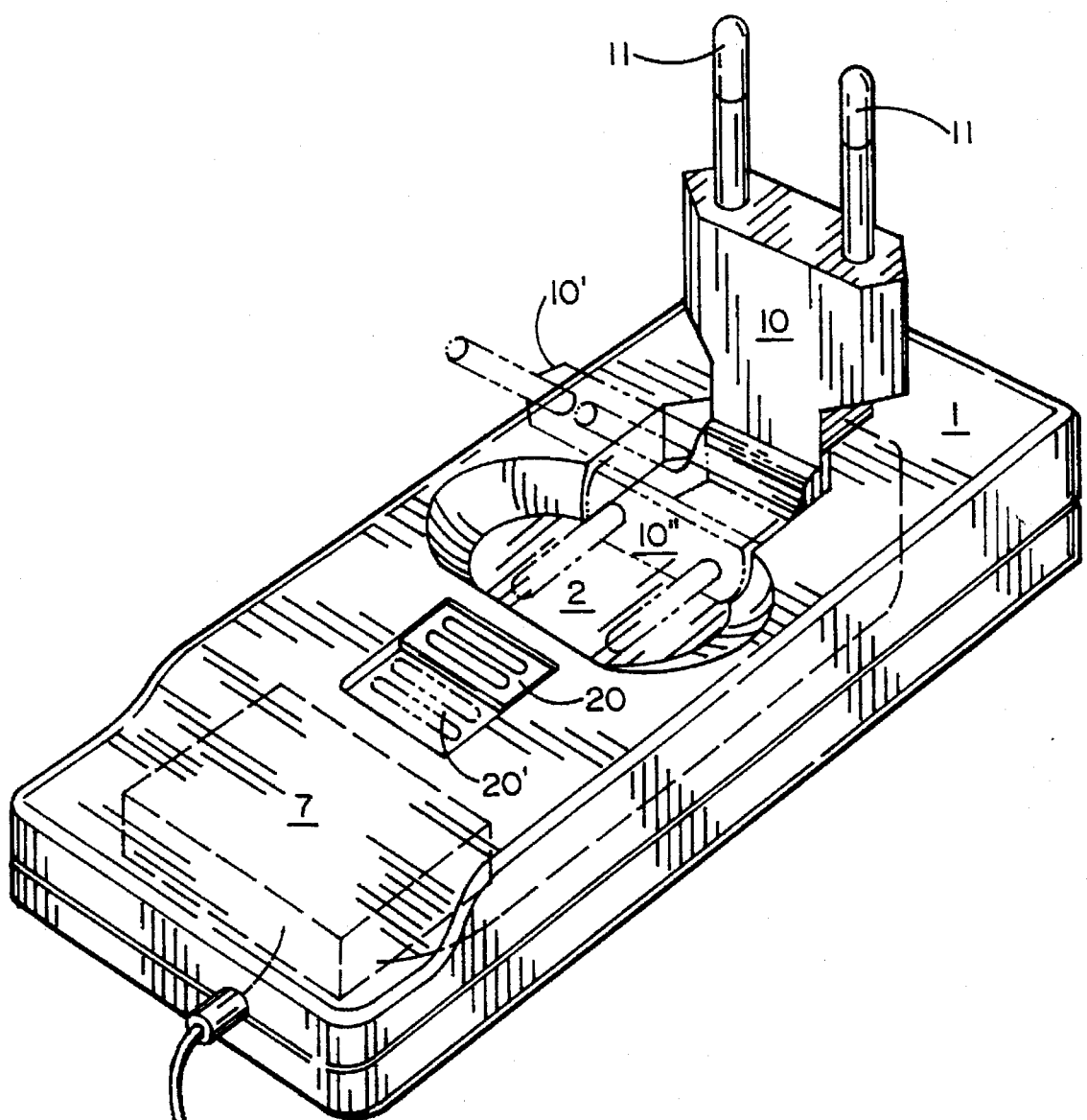
FIG. 1 illustrates a perspective view of the collapsible plug device showing the plug in an extended position and movable to an intermediate position and a collapsed position.

Referring to FIG. 1, casing 1 includes cavity 2 which is designed to accommodate plug 10 and prongs 11 in collapsed position 10" so that the plug is generally flush with the surface of casing 1. Plug 10 can be moved from a collapsed position 10" to intermediate position 10' and to a fully extended position, as illustrated in FIG. 1. Release button 20 moves between positions 20' when the plug is in the collapsed position to position 20 when the plug is in the locked, extended position. In a preferred embodiment, casing 1 is made of high impact thermoplastic material, with top and bottom halves which can be sealed together with ultrasonic bonding.

In one preferred embodiment, power supply 7 is connected to prongs 11 and also through electrical cable 5 to an electrical connection means such as power adapter plug 6, which can in turn be connected to an electronic device 8.

Figure 6:
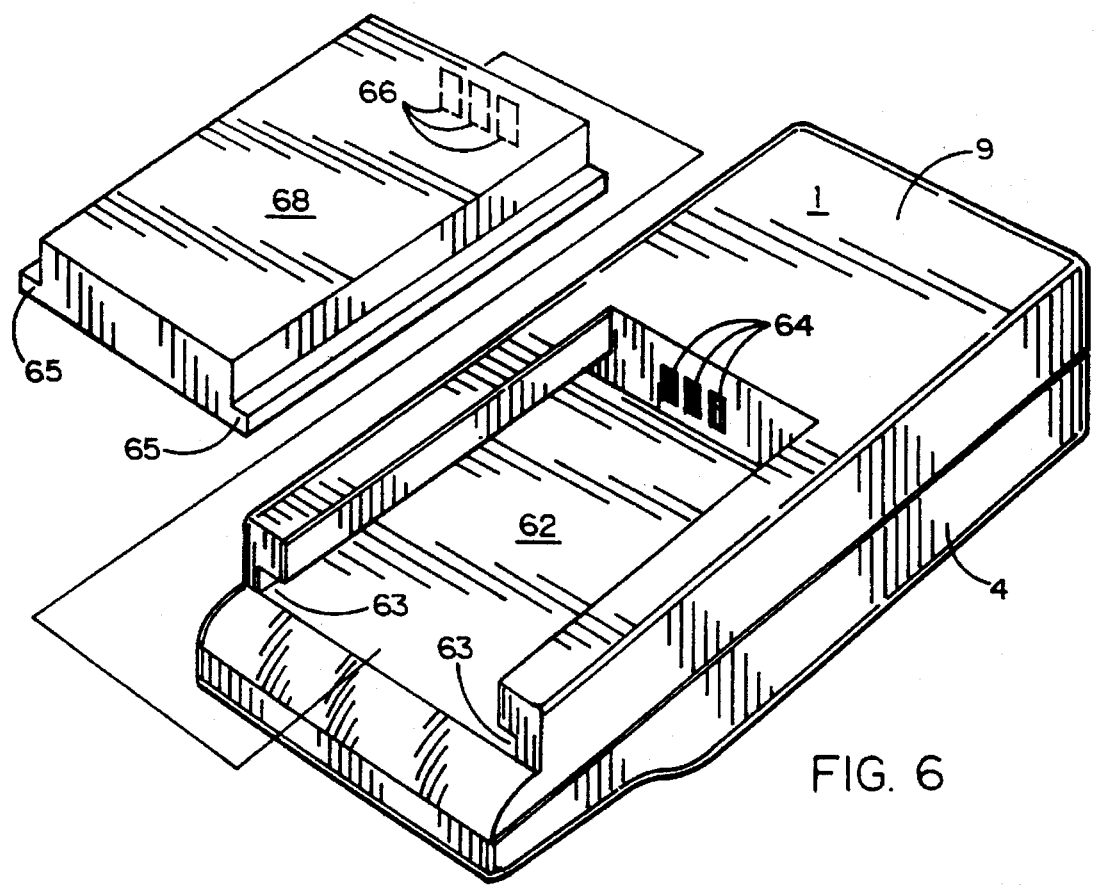
FIG. 6 illustrates a view of the charger with a cradle for a rechargeable device.
Figure 7A:
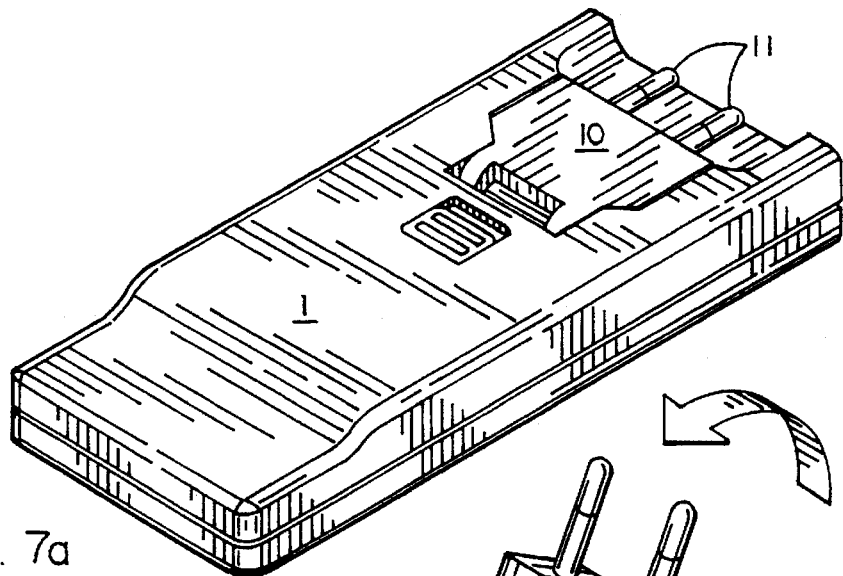
FIGS. 7A, 7B and 7C illustrate perspective views of an alternative embodiment of the collapsible plug device showing the plug in a collapsed position and movable to an intermediate position and an extended position.
Figure 7B:
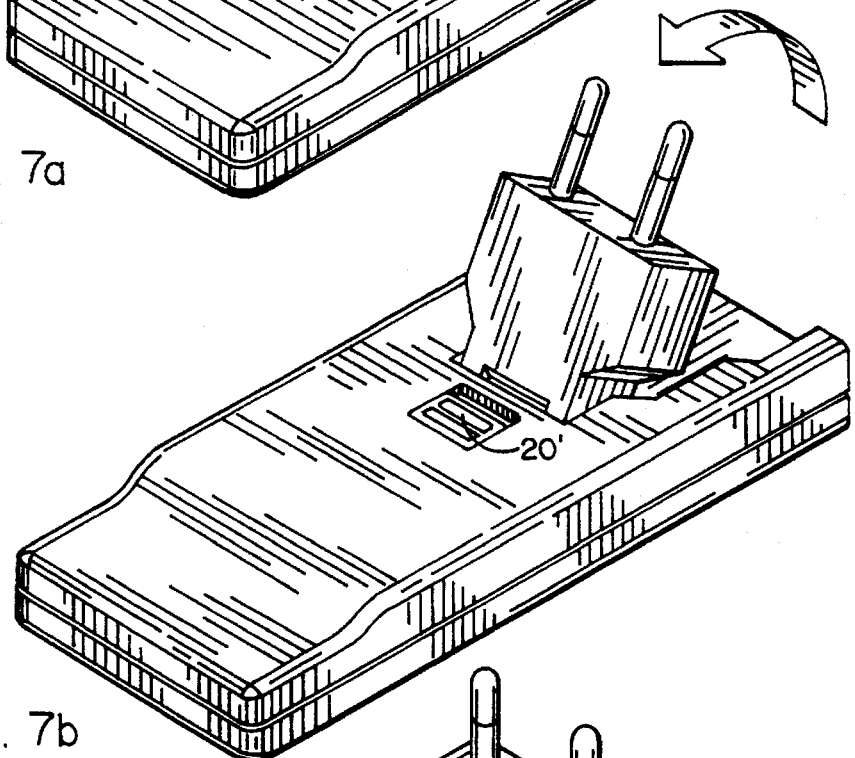
Figure 7C:
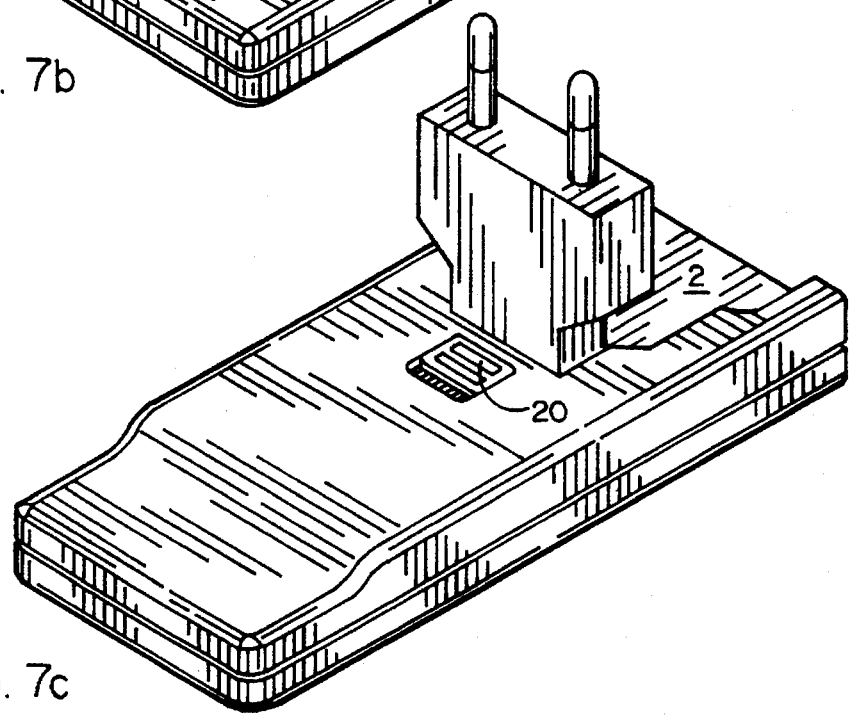

In another preferred embodiment, casing 1 incorporates a cradle or battery holder, as illustrated in FIG. 6. Referring to FIG. 6, bottom 9 of casing 1 includes cradle 62, with guide channels 63 and cradle electrical contacts 64. Battery 68 has tongues 65 to fit in channels 63 and battery electrical contacts 66 to connect with cradle electrical contacts 64. One skilled in the art can select one of several ways for battery 68 to be secured in cradle 62 by gravity, friction, or by a locking mechanism (not shown). The battery can thus be electrically and mechanically attached to the cradle. Power supply 7 can be connected to cradle electrical contacts 64 to provide power for battery 68.

Figure 2:
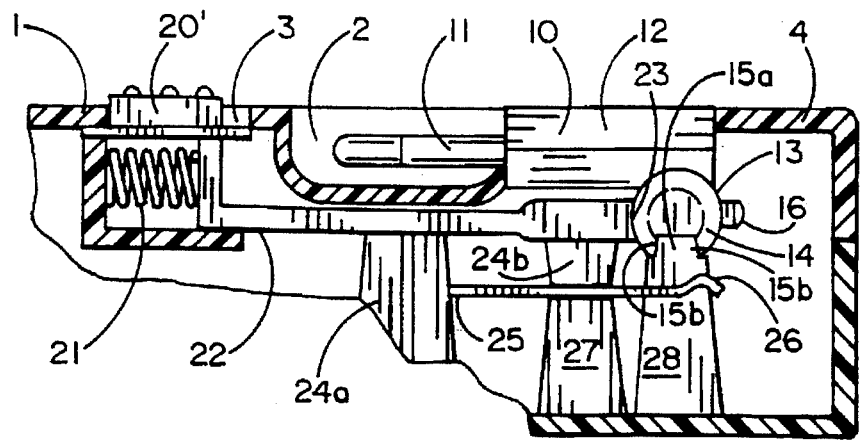
FIG. 2 illustrates a cross-section of the device, showing the plug in the fully collapsed position.

FIG. 2 illustrates a cutaway, side view of a preferred embodiment of the new device. Casing 1 includes various features to support and position various components of the device. Referring to FIG. 2, plug body 12 of electrical plug 10 is positioned generally flush with casing 1. Prongs 11 are positioned within cavity 2 below the top 4 of casing 1. Plug body 12 is integrally connected to shaft 13, a cylindrical element which is terminated at each end by a peg 14. Each peg 14 rests on shaft support 28 and is positioned by upper shaft support 28A. Detent 15 is cut into shaft 13 and electrical pin 16 extends radially outward from shaft 13. Electrical pin 16, connected to prong 11, is positioned to engage spring tip 26 as plug body 12 and shaft 13 are rotated. This pushes conducting spring 25 downward but as rotation of plug body 12 continues, electrical pin 16 moves past spring tip 26 so that conducting spring 25 can return to approximately its resting position, with sufficient pressure to establish good electrical connection with electrical pin 16. Moving electrical pin 16 past spring tip 26 requires some force to overcome the tension in conducting spring 25, which will tend to maintain plug body 12 in either the collapsed position shown in FIG. 2 or in the fully extended position shown in FIG. 4. Conducting spring 25 is mounted within casing 1 and positioned and supported by spring guide 27. One conducting spring 25 and a corresponding electrical pin 16 are provided for connection to each prong 11. A typical collapsible plug includes two or three prongs 11.

Figure 3:
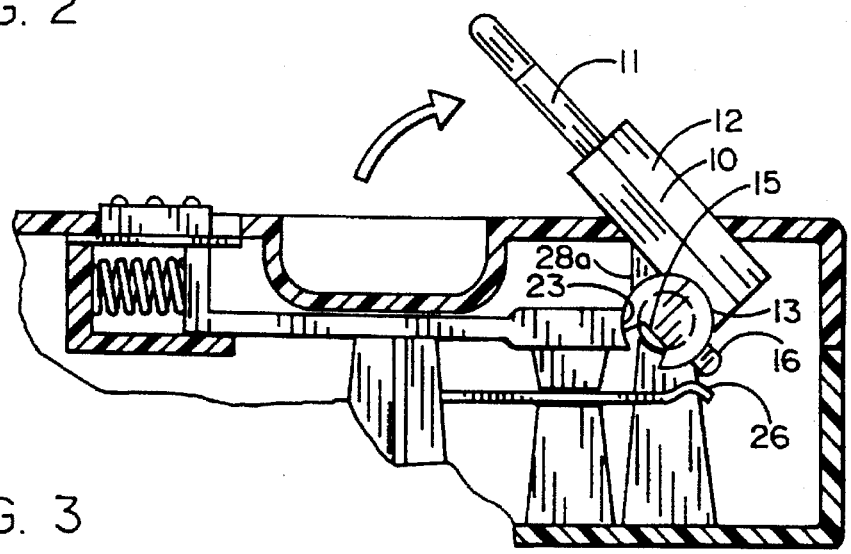
FIG. 3 illustrates the same cross-section, with the plug in an intermediate position.
Figure 4:
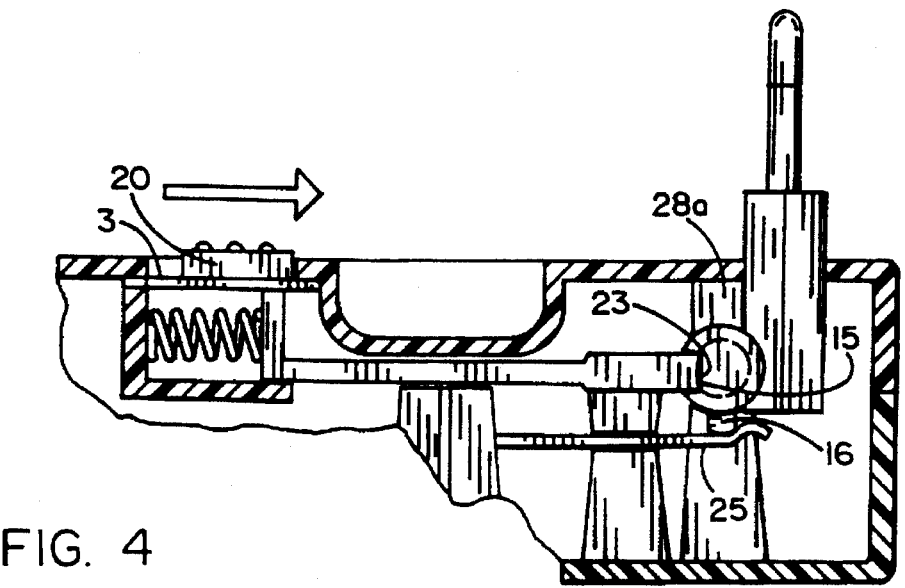
FIG. 4 illustrates the same cross-section, with the plug in an extended and locked position.
Figure 5:
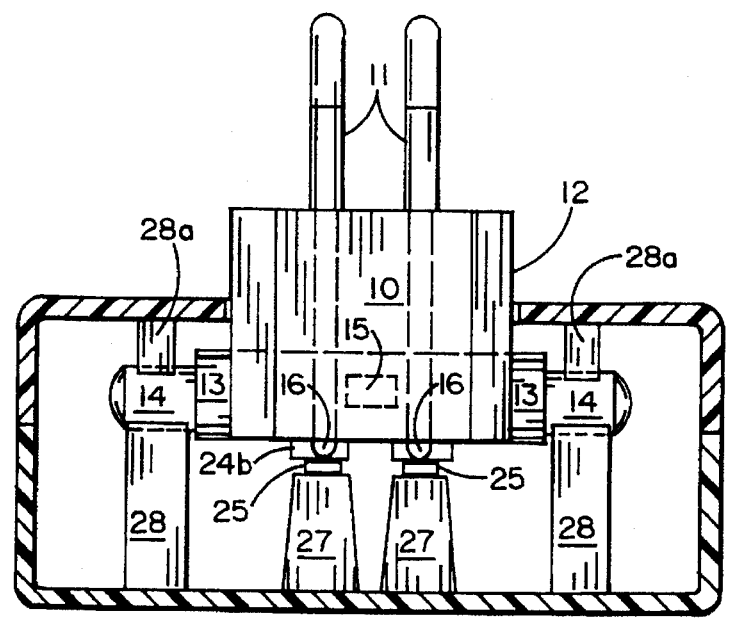
FIG. 5 illustrates an end-view cross-section, with the plug in an extended and locked position.

Lock bar 22 is slidably positioned within casing 1, supported by lock bar guides 24A and 24B. Referring to FIGS. 2 and 4, lock bar 22 is pressed against shaft 13 by lock bar spring 21, which pushes, in turn, against a portion of casing 1. In FIG. 2, lock bar spring 21 is compressed, pushing lock bar 22 against shaft 13. Release button 20, which is connected to and preferably integral with lock bar 22, is in the release position 20', generally away from shaft 13 and electrical plug 10:

As plug body 12 is raised, shaft 13 rotates, moving detent 15 closer to lock bar tip 23. Referring to FIG. 3, in a preferred embodiment, electrical pin 16 engages conducting spring tip 26 and lock bar tip 23 engages detent 15 at about the same point in the rotation of plug body 12 and shaft 13. When plug body 12 is in a fully extended position, generally perpendicular to top 4, lock bar tip 23 is pressed into detent 15 by the pressure of lock bar spring 21. Release button 20 moves in channel 3 closer to plug body 12. Channel 3 in casing 1 is designed to accommodate release button 20 in the locked and released positions.

Detent 15 is shaped to closely accommodate the configuration of lock bar tip 23. In a preferred embodiment, lock bar tip 23 is generally rectangular. Detent 15 includes base 15A which is generally flat and designed to fit against the lock bar tip 23, while sides 15B of detent 15 are spaced apart and angled slightly to accommodate the sides of lock bar 22 in the vicinity of lock bar tip 23.

The pressure of lock bar spring 21 will maintain plug body 12 in the extended position until a user activates release button 20, moving it from the locked position shown in FIG. 4 to the released position 20' shown in FIGS. 2 and 3. Once the release button is moved and lock bar tip 23 is removed from detent 15 at least far enough so that shaft 13 can rotate freely, the user can move plug body 12 towards and to the collapsed position.

Figure 8A:
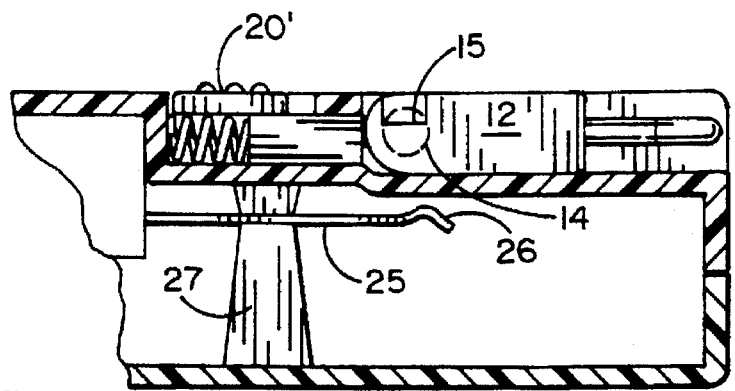
FIGS. 8A, 8B, and 8B illustrate cross-sections of the device shown in FIGS. 7A, 7B and 7C.
Figure 8B:
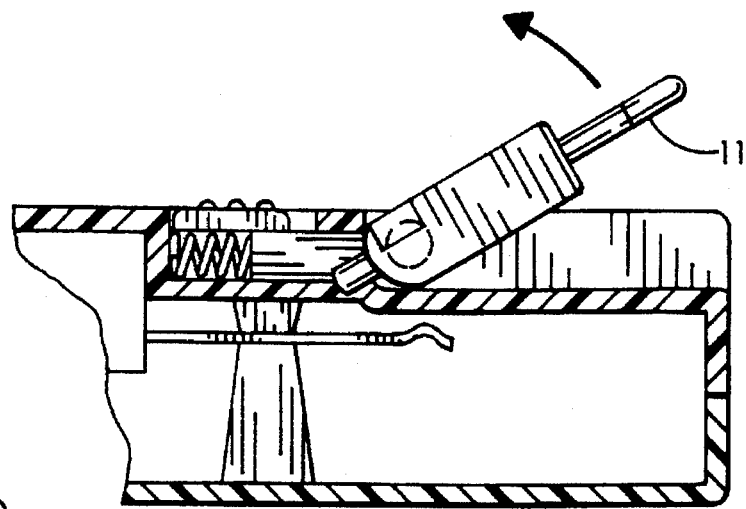
Figure 8C:
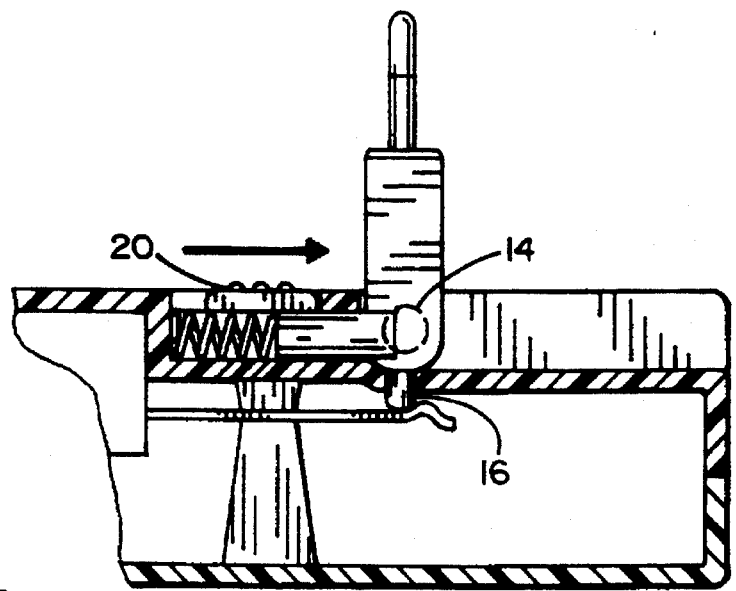

A variety of configurations of these elements, including several alternatives are possible and will be recognized by one skilled in the art. Referring to FIGS. 7A, 7B, 7C and 8A, 8B and 8C, channel 2 is positioned near the end of casing 1. The elements and general discussion above with regard to FIG. 1 is pertinent to FIGS. 7A, 7B and 7C. Similarly, many of the elements shown in FIGS. 2, 3 and 4 are found in FIGS. 8A, 8B and 8C, although not all with the same position. The operation of the embodiment illustrated in FIGS. 8A, 8B, and 8C is identical or similar to the discussion above relating to FIGS. 2, 3 and 4. The embodiment illustrated in FIGS. 8A, 8B and 8C does not include shaft 13 but rather incorporates that function in plug body 12. Pegs 14 protrude from opposite sides of plug body 12 to provide support and pivot points for plug 10. Detent 15 is now cut into plug body 12. Lock bar 22 has been shortened to reach the plug which is now much closer.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A collapsible plug device comprising a casing, an electrical plug rotatably mounted in said casing, said electrical plug including a plurality of prongs, said electrical plug rotatable between a collapsed and an extended position, relative to said casing, and a releasable locking means mechanically connected to said casing to engage said electrical plug and to prevent said electrical plug from moving from said extended position, whereby the electrical plug is locked into the extended position until and unless a user releases the releasable locking means.

2. The collapsible plug device of claim 1 further comprising a cradle means or attachment means integrated into said casing, an electrical connection means fitted in said cradle means or attachment means, and a mechanical connection means fitted in said cradle means or attachment means, whereby a device including a rechargeable battery can be received and electrically and mechanically attached to said cradle means or attachment means.

3. The collapsible plug device of claim 1 further comprising an electrical cable connected to said casing and connectible to said prongs, and an electrical connection means connected to said electrical cable, said electrical connection means designed to provide an electrical connection to a device including a rechargeable battery, whereby said device including a rechargeable battery can be connected to a source of power.

4. The collapsible plug device of claim 1 further comprising a power supply mounted within said casing and mechanically and electrically connected to said prongs.

5. The collapsible plug device of claims 2 and 4 further comprising a connection means between said power supply and said electrical connection means fitted in said cradle means or attachment means.

6. The collapsible plug device of claims 3 and 4 wherein said electrical cable is connected to said prongs through said power supply, said collapsible plug device further comprising a connection means between said power supply and said electrical connection means connected to said electrical cable.

7. The collapsible plug device of claim 1 where said electrical plug means includes a notch to accommodate said locking means.

8. The collapsible plug device of claim 1 wherein said locking means comprises a spring loaded arm for engaging said electrical plug means.

9. A power supply with a collapsible plug comprising a casing, a power supply mounted within said casing, an electrical plug rotatably mounted in said casing, said electrical plug including a plurality of prongs mechanically and electrically connected to said power supply, said electrical plug rotatable between a collapsed and an extended position, relative to said casing, a releasable locking means mechanically connected to said casing to engage said electrical plug and to prevent said electrical plug from moving from said extended position, whereby the electrical plug can be locked into the extended position until and unless a user releases the releasable locking means, a cradle means or attachment means integrated into said casing, an electrical connection means fitted in said cradle means or attachment means, electrically connected to said power supply, and a mechanical connection means fitted in said cradle means or attachment means, whereby a device can be received and electrically and mechanically attached to said cradle means or attachment means.

10. A battery charger with a collapsible plug comprising a casing, a power supply mounted within said casing, an electrical plug rotatably mounted in said casing, said electrical plug including a plurality of prongs mechanically and electrically connected to said power supply, said electrical plug rotatable between a collapsed and an extended position, relative to said casing, a releasable locking means mechanically connected to said casing to engage said electrical plug and to prevent said electrical plug from moving from said extended position, whereby the electrical plug can be locked into the extended position until and unless a user releases the releasable locking means, a cradle means or attachment means integrated into said casing, an electrical connection means fitted in said cradle means or attachment means, electrically connected to said power supply, a mechanical connection means fitted in said cradle means or attachment means, and a device which includes a rechargeable battery, said device and said cradle designed to be mechanically connected so as to establish an electrical connection between said rechargeable battery and said power supply through said electrical connection means in said cradle, whereby a device can be received and electrically and mechanically attached to said cradle means or attachment means.

* * * * *